(12) United States Patent
Bludau et al.

(10) Patent No.: US 12,366,301 B2
(45) Date of Patent: Jul. 22, 2025

(54) CHECK VALVE FOR HIGH-PRESSURE FLUIDS, INCLUDING ABRASIVES LADEN FLUIDS

(71) Applicant: Proserv Gilmore Valve LLC, Houston, TX (US)

(72) Inventors: Ryan Bludau, Katy, TX (US); Stuart Macintyre, Humble, TX (US); Christopher Clark Barnes, Houston, TX (US)

(73) Assignee: Proserv Gilmore Valve LLC, Houston, TX (US)

( * ) Notice: Subject to any disclaimer, the term of this patent is extended or adjusted under 35 U.S.C. 154(b) by 0 days.

(21) Appl. No.: 18/073,252

(22) Filed: Dec. 1, 2022

(65) Prior Publication Data

US 2023/0175603 A1 Jun. 8, 2023

Related U.S. Application Data

(60) Provisional application No. 63/339,571, filed on May 9, 2022, provisional application No. 63/285,639, filed on Dec. 3, 2021.

(51) Int. Cl.
  *F16K 17/04* (2006.01)
  *F16K 15/06* (2006.01)
  *F16J 15/06* (2006.01)

(52) U.S. Cl.
  CPC ........ *F16K 17/0466* (2013.01); *F16K 15/063* (2013.01); *F16J 15/067* (2013.01)

(58) Field of Classification Search
  CPC .... F16K 17/0466; F16K 15/063; F16K 15/03; F16K 15/06; F16K 15/066; F16K 15/064;
  (Continued)

(56) References Cited

U.S. PATENT DOCUMENTS

| 402,600 A | 5/1889 | Kemp |
| 1,654,642 A | 1/1928 | Geissinger |

(Continued)

FOREIGN PATENT DOCUMENTS

| CH | 469928 A | 3/1969 |
| DE | 102014224979 A1 | 6/2016 |

(Continued)

OTHER PUBLICATIONS

PCT International Search Report and Written Opinion dated Dec. 1, 2017, for International Application No. PCT/US2017/051567.

(Continued)

*Primary Examiner* — Craig J Price
(74) *Attorney, Agent, or Firm* — Patterson + Sheridan, LLP

(57) ABSTRACT

A valve includes a first body having an inlet and a ledge surrounding the inlet at a location inwardly of the body, a second body having an outlet and a poppet bore having a circumferential poppet bore surface, a poppet located in the poppet bore and having a sealing face, the sealing face facing the ledge of the first body, and a sealing arrangement which includes a circumferential support surface, a compressible seal ring having an uncompressed free state and a compressed state, an outer circumferential surface, and an inner circumferential surface facing the circumferential support surface, and a split ring disposed over the outer circumferential surface of the compressible seal ring, the compressible seal ring in a compressed state between the split ring and the inner circumferential surface.

13 Claims, 13 Drawing Sheets

(58) Field of Classification Search
CPC .... F16K 15/065; F16K 15/067; F16K 15/026; F16K 1/465; F16K 25/005; F16J 15/188; F16J 15/067
USPC ............ 137/511–543.23; 251/332, 333, 362, 251/363; 277/590–654
See application file for complete search history.

(56) References Cited

U.S. PATENT DOCUMENTS

| | | |
|---|---|---|
| 1,751,664 A | 3/1930 | Smith |
| 2,140,735 A | 12/1938 | Gross |
| 2,311,851 A | 2/1943 | McClure |
| 2,560,841 A | 7/1951 | Bishop |
| 2,605,108 A | 7/1952 | Stephens |
| 2,685,296 A | 8/1954 | Boosman |
| 2,729,226 A | 1/1956 | Jones |
| 2,799,523 A | 7/1957 | Parker |
| 2,811,979 A | 11/1957 | Presnell |
| 2,821,972 A | 2/1958 | Banker |
| 2,847,027 A | 8/1958 | Kumpman |
| 2,862,520 A | 12/1958 | Cordova |
| 2,867,463 A | 1/1959 | Snider |
| 2,892,644 A | 6/1959 | Collins |
| 2,906,290 A | 9/1959 | Harding et al. |
| 2,973,746 A | 3/1961 | Jupa |
| 3,022,794 A | 2/1962 | Pippenger |
| 3,114,391 A | 12/1963 | Kurtz |
| 3,145,723 A | 8/1964 | Chorkey |
| 3,189,049 A | 6/1965 | Carlson |
| 3,219,060 A | 11/1965 | Pearl et al. |
| 3,225,786 A | 12/1965 | Elliott |
| 3,279,805 A | 10/1966 | Quinson |
| 3,316,930 A | 5/1967 | Garduer |
| 3,352,394 A | 11/1967 | Longshore |
| 3,421,533 A | 1/1969 | Conn |
| 3,474,828 A | 10/1969 | Wheeler et al. |
| 3,485,225 A | 12/1969 | Bailey et al. |
| 3,533,431 A | 10/1970 | Kuenzel et al. |
| 3,536,085 A | 10/1970 | Taplin |
| 3,540,695 A | 11/1970 | Taylor |
| 3,587,647 A | 6/1971 | Walters |
| 3,598,148 A | 8/1971 | Kroffke |
| 3,635,436 A | 1/1972 | Tillman |
| 3,662,950 A | 5/1972 | McIntosh et al. |
| 3,683,694 A | 8/1972 | Granberg |
| 3,749,122 A | 7/1973 | Gold |
| 3,797,525 A | 3/1974 | Lieser |
| 3,913,620 A | 10/1975 | Pauliukonis |
| 3,949,645 A | 4/1976 | Masclet |
| 3,978,888 A | 9/1976 | Naono |
| 4,220,174 A | 9/1980 | Spitz |
| 4,240,634 A | 12/1980 | Wiczer |
| 4,253,481 A | 3/1981 | Sarlls, Jr. |
| 4,263,938 A | 4/1981 | Peters |
| 4,281,677 A | 8/1981 | Hoffman |
| 4,336,946 A | 6/1982 | Wheeler |
| 4,396,071 A | 8/1983 | Stephens |
| 4,444,216 A | 4/1984 | Loup |
| 4,457,489 A | 7/1984 | Gilmore |
| 4,475,568 A | 10/1984 | Loup |
| 4,491,154 A | 1/1985 | Peters |
| 4,493,335 A | 1/1985 | Watson |
| 4,554,940 A | 11/1985 | Loup |
| 4,793,590 A | 12/1988 | Watson |
| 4,856,557 A | 8/1989 | Watson |
| 4,877,057 A | 10/1989 | Christensen |
| 4,890,645 A | 1/1990 | Andersen |
| 4,968,197 A | 11/1990 | Chen |
| 5,035,265 A | 7/1991 | Chen |
| 5,069,240 A | 12/1991 | Kurkjian, Jr. |
| 5,190,078 A | 3/1993 | Stoll et al. |
| 5,222,521 A | 6/1993 | Kihlberg |
| 5,301,637 A | 4/1994 | Blount |
| 5,771,931 A | 6/1998 | Watson |
| 5,771,993 A | 6/1998 | Anderson et al. |
| 5,778,918 A | 7/1998 | McLelland |
| 5,797,431 A | 8/1998 | Adams |
| 5,901,749 A | 5/1999 | Watson |
| 6,041,804 A | 3/2000 | Chatufale |
| 6,257,268 B1 | 7/2001 | Hope et al. |
| 6,264,206 B1 | 7/2001 | Hashizawa et al. |
| 6,296,008 B1 | 10/2001 | Boyer et al. |
| 6,318,400 B1 | 11/2001 | Hope et al. |
| 6,382,256 B2 | 5/2002 | Kim et al. |
| 6,520,478 B1 | 2/2003 | Hope et al. |
| 6,523,613 B2 | 2/2003 | Rayssiguier et al. |
| 6,651,696 B2 | 11/2003 | Hope et al. |
| 6,668,861 B2 | 12/2003 | Williams |
| 6,702,024 B2 | 3/2004 | Neugebauer |
| 6,843,266 B2 | 1/2005 | Hope et al. |
| 6,901,960 B2 | 6/2005 | Roberts et al. |
| 6,983,803 B2 | 1/2006 | Watson et al. |
| 7,000,890 B2 | 2/2006 | Bell et al. |
| 7,073,590 B2 | 7/2006 | Neugebauer et al. |
| 7,159,605 B2 | 1/2007 | Thrash, Jr. et al. |
| 7,428,913 B2 | 9/2008 | Benson |
| 7,438,086 B2 | 10/2008 | Bento et al. |
| 7,464,722 B2 * | 12/2008 | Jansen ................. F16K 17/0433 137/454.2 |
| 7,520,297 B2 | 4/2009 | Bell et al. |
| 7,628,170 B2 | 12/2009 | Kok-Hiong et al. |
| 7,784,553 B2 | 8/2010 | Moreno |
| 7,959,161 B2 | 6/2011 | Seki et al. |
| 8,052,119 B2 | 11/2011 | Numazaki et al. |
| 8,245,729 B2 | 8/2012 | Zub |
| 8,246,055 B2 | 8/2012 | Asplund et al. |
| 8,342,202 B2 | 1/2013 | Nishio et al. |
| 8,397,742 B2 | 3/2013 | Thrash et al. |
| 8,408,244 B2 | 4/2013 | Gilcher |
| 8,453,678 B2 | 6/2013 | Neff et al. |
| 8,469,059 B1 | 6/2013 | Forst |
| 8,474,792 B2 | 7/2013 | Kubo et al. |
| 8,490,652 B2 | 7/2013 | Bohaychuk et al. |
| 8,627,893 B2 | 1/2014 | Otto et al. |
| 8,714,193 B2 | 5/2014 | Marica |
| 9,121,244 B2 | 9/2015 | Loretz et al. |
| 9,133,944 B2 | 9/2015 | Haeckel et al. |
| 9,297,462 B2 | 3/2016 | Hattori et al. |
| 9,334,946 B1 | 5/2016 | Mason |
| 9,354,638 B2 | 5/2016 | Rebreanu et al. |
| 9,423,031 B2 | 8/2016 | Weintraub et al. |
| 9,719,600 B2 | 8/2017 | Patterson |
| 9,874,282 B2 | 1/2018 | Wetzel et al. |
| 10,012,325 B2 | 7/2018 | Bohaychuk et al. |
| 10,385,982 B2 | 8/2019 | Patterson et al. |
| 11,041,358 B2 | 6/2021 | Jones et al. |
| 2004/0047748 A1 | 3/2004 | Roberts et al. |
| 2004/0173976 A1 | 9/2004 | Boggs |
| 2004/0262007 A1 | 12/2004 | Neugebauer et al. |
| 2005/0028864 A1 | 2/2005 | Thrash et al. |
| 2005/0067031 A1 | 3/2005 | Lee |
| 2006/0137744 A1 | 6/2006 | Anastas |
| 2006/0237064 A1 | 10/2006 | Benson |
| 2007/0000544 A1 | 1/2007 | Thompson |
| 2007/0069576 A1 | 3/2007 | Suzuki |
| 2007/0113906 A1 | 5/2007 | Sturman et al. |
| 2010/0044605 A1 | 2/2010 | Veilleux |
| 2010/0140881 A1 | 6/2010 | Matsuo |
| 2010/0154896 A1 | 6/2010 | Thrash, Jr. et al. |
| 2010/0243084 A1 | 9/2010 | Yoshioka et al. |
| 2011/0253240 A1 | 10/2011 | Otto et al. |
| 2012/0248358 A1 | 10/2012 | Pic et al. |
| 2012/0292550 A1 | 11/2012 | Meek |
| 2013/0032222 A1 | 2/2013 | Bresnahan |
| 2013/0037736 A1 | 2/2013 | Bresnahan |
| 2013/0146303 A1 | 6/2013 | Gustafson |
| 2013/0181154 A1 | 7/2013 | Robison et al. |
| 2013/0220441 A1 | 8/2013 | Zanettacci |
| 2014/0116551 A1 | 5/2014 | Smith |
| 2014/0377111 A1 | 12/2014 | Bagagli et al. |
| 2015/0060715 A1 | 3/2015 | Hoang |
| 2015/0152959 A1 | 6/2015 | Mangiagli et al. |
| 2015/0191996 A1 | 7/2015 | Weintraub |
| 2015/0191997 A1 | 7/2015 | Weintraub et al. |

(56) References Cited

U.S. PATENT DOCUMENTS

| | | |
|---|---|---|
| 2015/0276072 A1 | 10/2015 | Rebreanu et al. |
| 2015/0276083 A1 | 10/2015 | Druhan et al. |
| 2015/0362083 A1 | 12/2015 | Patterson |
| 2015/0369002 A1 | 12/2015 | Patterson |
| 2016/0103456 A1 | 4/2016 | Cho et al. |
| 2016/0123478 A1 | 5/2016 | Wetzel et al. |
| 2016/0230900 A1 | 8/2016 | Schulz et al. |
| 2016/0258531 A1 | 9/2016 | Ito et al. |
| 2016/0258537 A1 | 9/2016 | Heiderman et al. |
| 2017/0037984 A1 | 2/2017 | Frippiat et al. |
| 2017/0097100 A1 | 4/2017 | Patterson |
| 2017/0175916 A1 | 6/2017 | Huynh et al. |
| 2017/0189730 A1 | 7/2017 | Ernfjall |
| 2017/0220054 A1 | 8/2017 | Zhu et al. |
| 2017/0241563 A1 | 8/2017 | Simpson |
| 2017/0260831 A1 | 9/2017 | Green |
| 2017/0314689 A1 | 11/2017 | Osterbrink et al. |
| 2017/0370481 A1 | 12/2017 | Glazewski |
| 2018/0073652 A1 | 3/2018 | Weintraub |
| 2019/0316687 A1 | 10/2019 | Bonanno |
| 2020/0096114 A1 | 3/2020 | Stetzer et al. |
| 2020/0124181 A1 | 4/2020 | Liu et al. |

FOREIGN PATENT DOCUMENTS

| | | | |
|---|---|---|---|
| DE | 102018107053 A1 | 10/2018 | |
| JP | 2019086086 A | 6/2019 | |
| KP | 20050045760 A | 5/2005 | |
| KR | 20160115751 A | 10/2016 | |
| WO | WO-2013113827 A1 * | 8/2013 | ............ F04D 29/10 |
| WO | 2020236853 A1 | 11/2020 | |

OTHER PUBLICATIONS

PCT International Search Report and Written Opinion dated Jan. 31, 2018, for International Application No. PCT/US2017/051550.

PCT International Search Report and Written Opinion dated Jun. 23, 2015, for International Application No. PCT/US2014/062114.

PCT/US2020/067625, International Search Report and Written Opinion dated May 4, 2021, 15 pages.

PCT/US2021/044762, International Search Report and Written Opinion dated Oct. 27, 2021, 12 pages.

India Application No. 2021137010322, Examination Report datd Jun. 5, 2021, 5 pages.

Indonesian Patent Application No. P00202101829-TA, Office Action dated Jul. 4, 2022.

PCT/US2022/080763, International Search Report and Written Opinion dated Mar. 27, 2023, 10 pages.

European Patent Application No. 20853585.6, Office Action dated Sep. 5, 2023, 6 pages.

Indian Application No. 202217042243, Examination Report dated Feb. 7, 2023, 6 pages.

Chinese Application No. 201980064890.3, Office Action dated Sep. 15, 2022, 22 pages.

PCT/US2024/049516, International Search Report and Written Opinion dated Feb. 10, 2025, 19 pages.

* cited by examiner

CHECK VALVE FOR HIGH-PRESSURE FLUIDS, INCLUDING ABRASIVES LADEN FLUIDS

CROSS-REFERENCE TO RELATED APPLICATIONS

This application claims benefit of U.S. provisional patent application Ser. No. 63/285,639, filed Dec. 3, 2021 and U.S. provisional patent application Ser. No. 63/339,571, filed May 9, 2022, which are herein incorporated by reference.

FIELD

The present disclosure relates to the field of valves, more particularly valves used in high pressure applications wherein a poppet is selectively seated against a seat surrounding a high pressure fluid flow passage, and the seating thereof against the seat prevents the high pressure fluid from flowing through the high pressure fluid flow passage to a vent or outlet passage of the valve. In an overpressure condition, the poppet will lift off of the seat, allowing the high pressure fluid to flow through the high pressure fluid flow passage to a vent or outlet passage of the valve, thereby relieving the overpressure condition at the high pressure fluid flow passage.

BACKGROUND

High pressure fluid circuits require pressure relief valves therein, which when an overpressure condition is present in the high pressure fluid circuit, allow fluid in the high pressure fluid circuit to pass therethrough to a lower pressure environment, and thereby relieve the overpressure condition in the high pressure fluid circuit. One issue with such valves is the use thereof in high fluid pressure circuits where the fluid is also carrying therein abrasives, for example a fracing fluid circuit wherein a fracing fluid, having proppants therein, is pumped to a high pressure to fracture rock formations in subsurface formations.

The abrasive nature of fracing fluids has limited the use of poppet based pressure relief valves in fracing fluid circuits, particularly high pressure fracing fluid circuits, as the rapidly abrade the seat or facing sealing face of the poppet to the condition where the valve will no longer seal off the high pressure fluid from passage therethrough, or otherwise erode the internal structures of the valve rendering it no longer useful for its intended purpose.

SUMMARY

Provided herein are valve constructs configured to provide a poppet valve for use as a pressure relief valve for a high pressure fluid circuit, including a high pressure fluid circuit for highly abrasive laden fluids, for example fracing fluids.

In one aspect, there is provided a valve having a first body having an inlet and a ledge surrounding the inlet at a location inwardly of the body, a second body having an outlet and a poppet bore having a circumferential poppet bore surface, a poppet located in the poppet bore and having a sealing face, the sealing face facing the ledge of the first body, and a sealing arrangement having a circumferential support surface, a compressible seal ring having an uncompressed free state and a compressed state, an outer circumferential surface, and an inner circumferential surface facing the circumferential support surface, and a split ring disposed over the outer circumferential surface of the compressible seal ring, the compressible seal ring in a compressed state between the split ring and the inner circumferential surface.

In another aspect, there is provided a valve, having a first body having an inlet and a ledge surrounding the inlet at a location inwardly of the body, a second body having an outlet and a poppet bore having a circumferential poppet bore surface, a poppet located in the poppet bore and having a sealing face, the sealing face facing the ledge of the first body and comprising at least one of a single crystal sapphire ring or a single crystal ruby ring having a seal ring annular surface facing the inlet, a sealing arrangement comprising a circumferential support surface, and a compressible seal ring, and a biasing member biasing the poppet in the direction of the inlet, wherein the seal ring annular surface is selectively engageable against the compressible seal ring.

In another aspect, there is provided a valve having a first body having an inlet and a ledge surrounding the inlet at a location inwardly of the body, a second body having an outlet and a poppet bore having a circumferential poppet bore surface, a poppet located in the poppet bore and having an annular sealing face, the sealing face facing the ledge of the first body, a sealing arrangement comprising a circumferential support surface, and a compressible seal ring, a poppet guide, the poppet guide comprising a central bore and a plurality of flow passages extending therethrough and circumferentially spaced from one another about the central bore; and a biasing member configured to bias the annular sealing face in the direction of the compressible seal ring.

In another aspect, a valve includes a first body having an inlet and a ledge surrounding the inlet at a location inwardly of the body, a second body having an outlet and a poppet bore having a circumferential poppet bore surface, a poppet located in the poppet bore, the poppet having a sealing face, the sealing face facing the ledge of the first body and a recess extending inwardly of the poppet and terminating at a base thereof, the base facing the inlet, the sealing face extending around the recess at a location intermediate of the base and the inlet, a sealing arrangement comprising a circumferential support surface, and a compressible seal ring and a biasing member biasing the poppet in the direction of the inlet, wherein the seal ring annular surface is selectively engageable against the compressible seal ring.

In another aspect, a method of forming a valve includes providing a first body having a first flow passage extending therethrough, and a circumferential ledge surrounding at least a portion of the first flow passage positioning a seal ring having an inner circumferential surface and an outer circumferential surface over the circumferential ledge positioning a split ring having a first portion comprising a first arcuate inner surface and a second portion having a second arcuate inner surface over the outer circumferential surface of the seal ring, with the first arcuate inner surface of the first portion of the split ring contacting a first portion of the outer circumferential surface of the seal ring and the second arcuate inner surface of the second portion of the split ring contacting a second portion of the outer circumferential surface of the seal ring and forming and maintaining a biasing force biasing the first arcuate inner surface of the first portion of the split ring contacting a first portion of the outer circumferential surface of the seal ring in the direction of the second portion of the split ring contacting a second portion of the outer circumferential surface of the seal ring.

DETAILED DESCRIPTION

Figure 1:
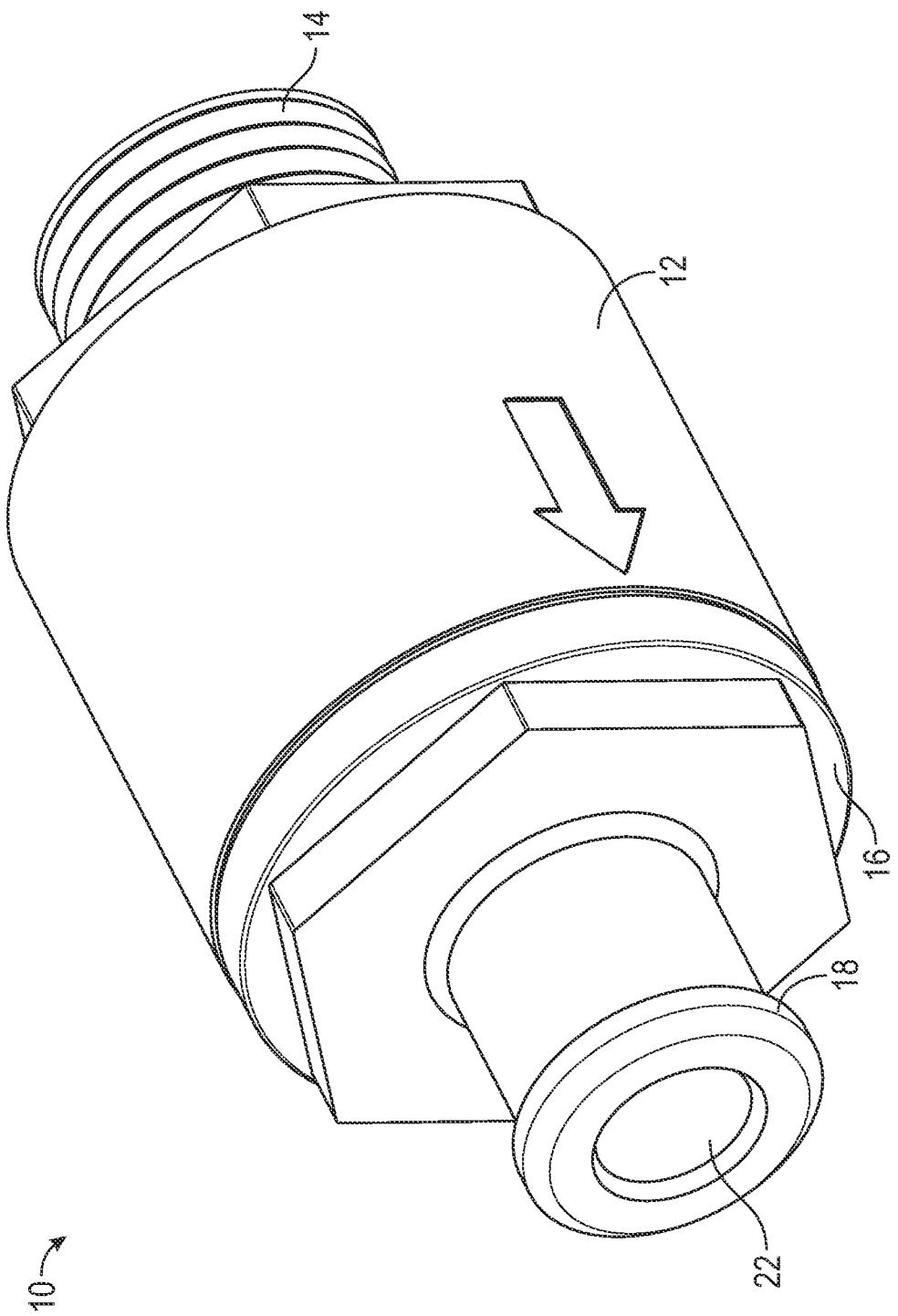
FIG. 1 is a perspective view of a pressure relief valve.
Figure 2:
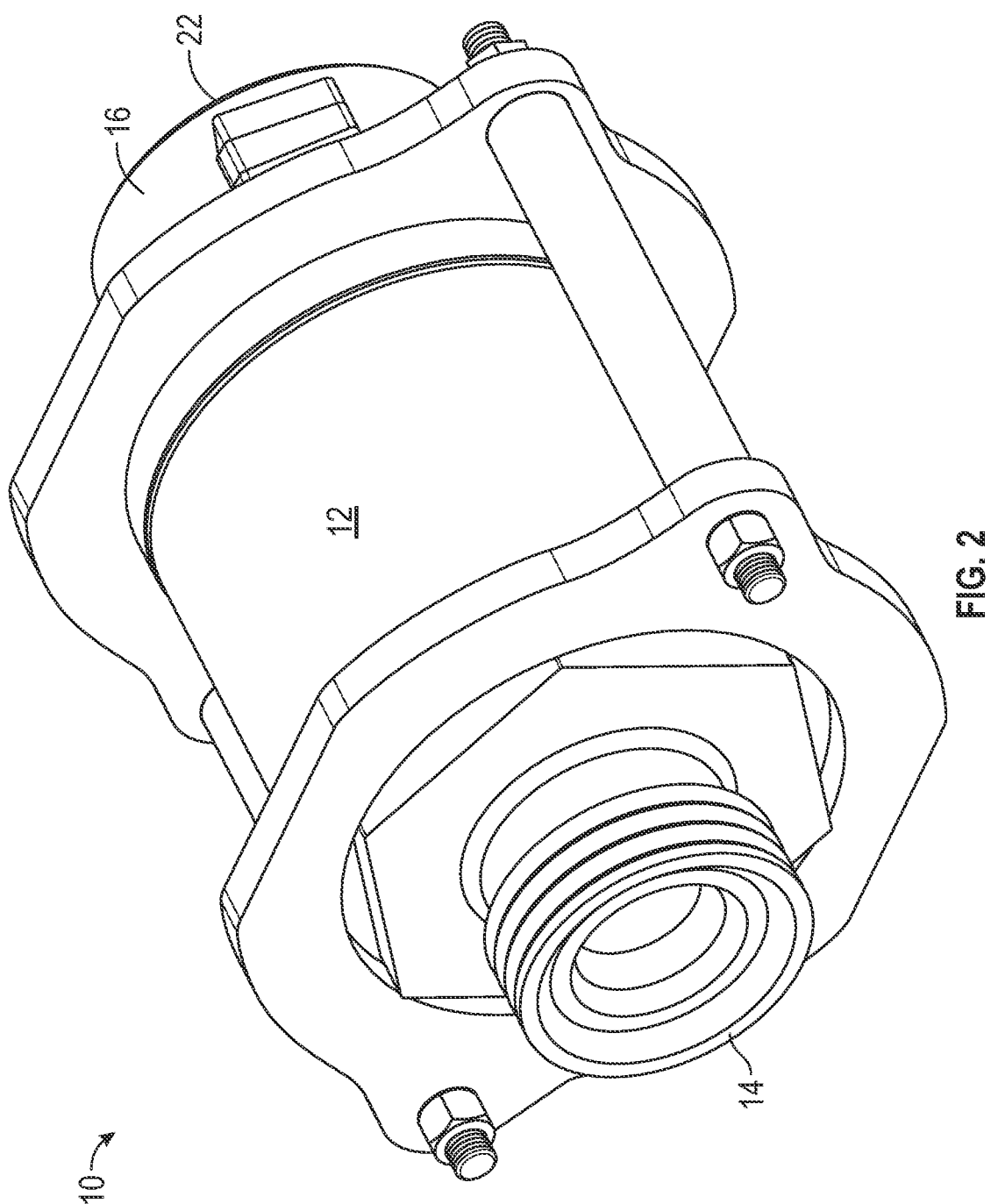
FIG. 2 is an additional perspective view of a pressure relief valve.

Referring initially to FIGS. 1 and 2, exterior perspective views of a pressure relief valve 10 are shown. Here, valve 10 includes an inlet body 12 (first body) connectable to a fluid circuit for relief of an overpressure therein through a valve inlet 14, and an outlet body 16 (second body) interconnected and secured to inlet body 12 and connectable to a relatively low pressure, as compared to the fluid pressure in the fluid circuit, pressure relief volume. To fluidly connect the valve 10 to a fluid circuit, the inlet body 12 includes an inlet 20, and the outlet body 16 includes an outlet 22, each of which provide a flow conduit for passage of fluid therethrough with the interior of the valve 10.

Figure 3A:
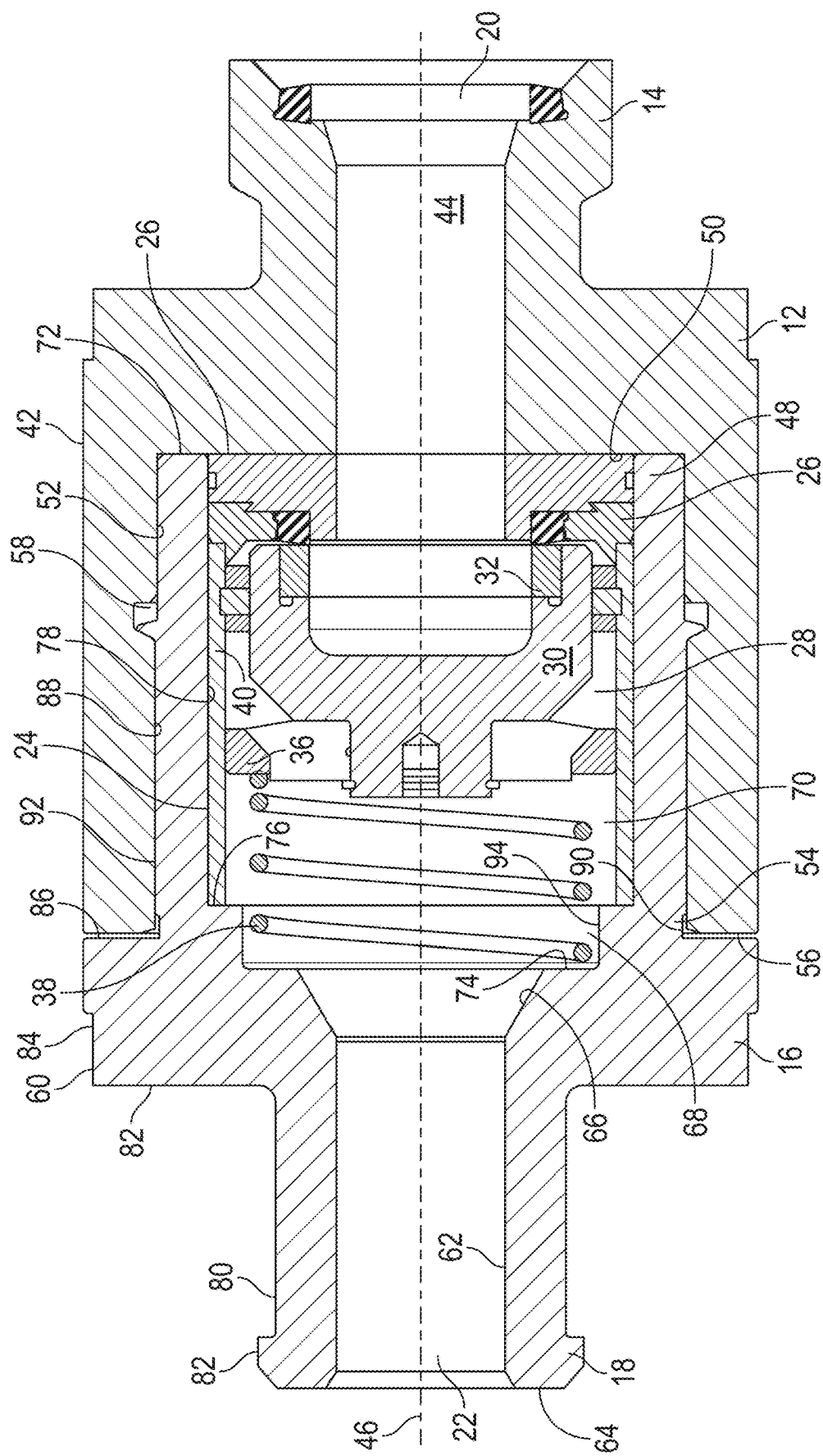
FIG. 3A is a sectional view of the valve in the closed position.
Figure 3B:
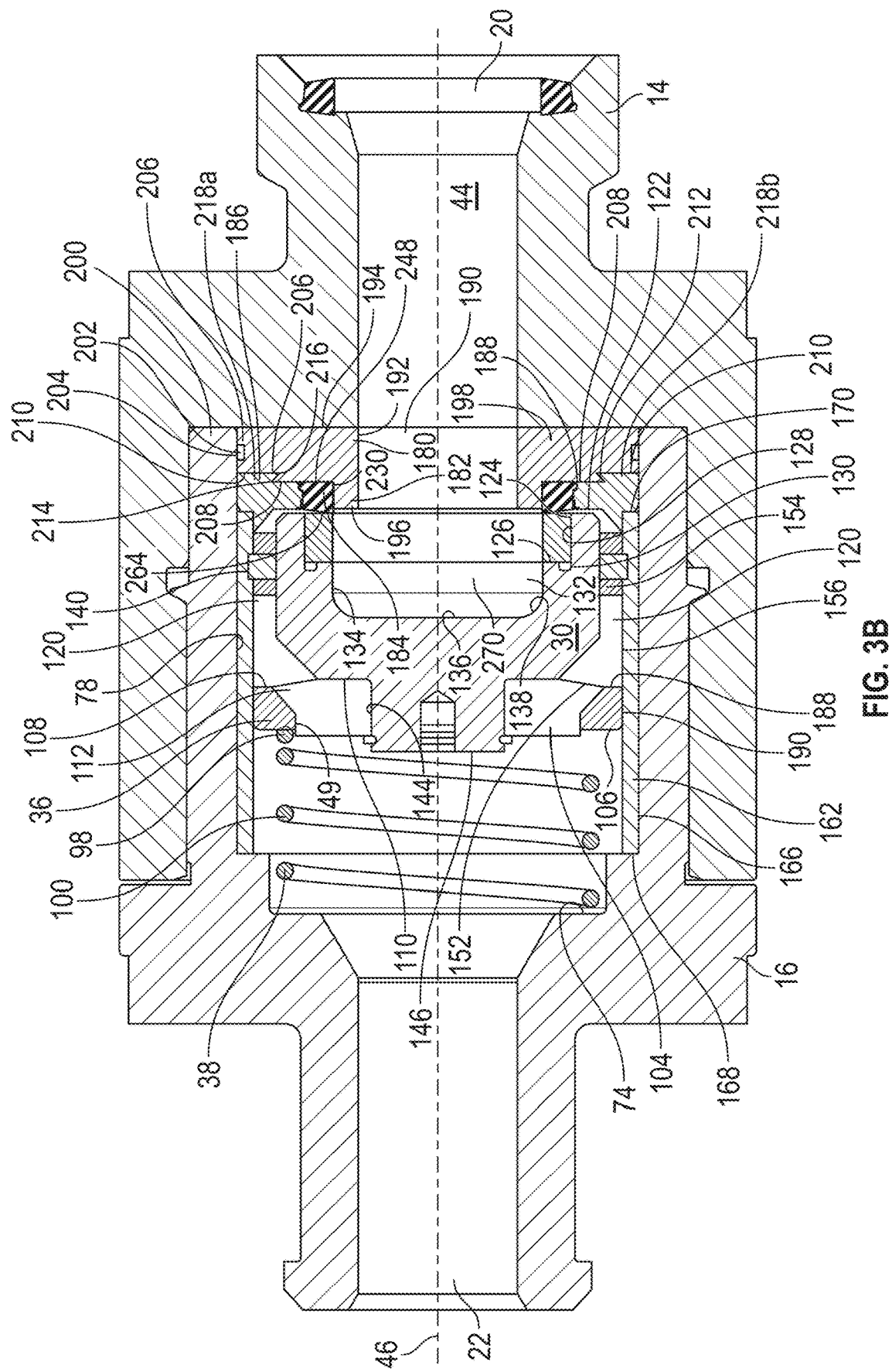
FIG. 3B is a sectional view of the valve in the closed position.

As shown in FIG. 3, valve 10 here includes, within an inner volume 24 enclosed within the inlet body 12 and outlet body 16, a seal assembly 26, a poppet 28 including a poppet body 30 having a seal 32 received thereon, a flow spider 34 and a backing ring 36 integrally configured therein, and a biasing member 38 configured to bias the poppet body 30 and the seal 32 therein in the direction of the seal assembly 26. Additionally, an inner sleeve 40 may be provided within the inner volume 24, if desired, to protect the inner surfaces of the outlet body 16 from the fluid passing therethrough in the event of a pressure relief event wherein the valve 10 is used to pass a high pressure fluid therethrough from the valve inlet 14 to a lower pressure region at the outlet 22 of valve 10. Here, the sleeve inner circumferential surface 41 defines a poppet bore 39 within which the poppet body 30 can be reciprocated.

Inlet body 12 is configured of a material such as steel, such as a high strength alloy steel. It includes an outer surface 42, a first bore 44 having a first circumference and extending inwardly of the inlet body 12 generally centered about a valve centerline 46, a second bore 48 having a second circumference greater than the first circumference, and an annular base wall 50. The second bore 48 includes an inner second bore wall 52 extending inwardly of the receiving end 54 of the inlet body 12, which is bounded by an annular end wall 56 surrounding the opening of the second bore 48 at the receiving end 54 of the inlet body 12. Annular base wall 50 extends generally perpendicular to, and from the inward terminus of, the second bore wall 52 to the opening of the first bore 44 into the second bore 48. Threads 58 extend along the inner bore wall 52 from the opening thereof at the annular end wall 56 of the inlet body 12 and at least partially along the expanse thereof in the direction of annular base wall 50.

Outlet body 16 includes an outer wall 60, outlet bore 62 opening into the outlet body 16 inwardly of the annular outlet end wall thereof, a tapered bore 66 extending inwardly of outlet body 16 therefrom, a spring bore 68 extending inwardly of outlet body 16 from the tapered bore 66, and major bore 70 extending from the spring bore 68 and terminating at the second body annular end wall 72. Spring bore 68 is larger in circumference than is outlet bore 62, and major bore 70 is larger in circumference than spring bore 68. Spring bore 68 is also larger in circumference than any circumference of the tapered bore 66, and tapered bore 66 extends from the end of the outlet bore 62 distal to outlet end wall to the spring bore 68. An annular spring ledge 74 extends from the inner terminus of the tapered bore 66 into the outlet body 16 to the spring bore 68, generally perpendicular to the valve centerline 46. Additionally, an annular retainer ledge 76 extends from the opening of the spring bore 68 into the major bore 70 to the inner circumferential surface 78 of the major bore 70. Outer wall 60 includes a spool 80 surrounding the outlet bore 62 and terminating in a raised circumferential flange 64, the spool 80 extending from the raised circumferential flange 64 to an annular outer wall 82. Annular outer wall 82 extends radially outwardly thereof and terminates at an outer short wall 84, which extends therefrom and terminates at annular limit wall 86. Annular limit wall 86 extends radially inwardly from outer short wall 84 to a stub wall 88 which surrounds inner circumferential surface 78 of the major bore 70, and terminates at the annular end wall 72. Stub wall 88 is threaded at least from a location thereof adjacent to the annular limit wall 86 to a location thereof intermediate of annular limit wall 86 and annular end wall 72. Thus, stub wall 88 may be threaded into the threads of the inner second bore wall 52 of the inlet body to secure the outlet body 16 to the inlet body 12. An undercut groove 90 is located on the stub wall 88 between the annular end wall 86 and the beginning of the threaded portion 92 of the stub wall 88.

The inner circumferential surface 78 of the major bore 70, the annular base wall of the inlet body 12, the annular retainer ledge 76, annular spring ledge 74 and a spring bore circumferential wall 94 bound the inner volume 24 of the valve 10 where the seal assembly 26, poppet 28 and biasing member 38 are maintained. Biasing member 38 is here configured as a spring coil 100 having a first end 96 in contact with the annular spring ledge 74 and a second end 98 thereof in contact with the backing ring 36 of the poppet 28. The spring coil 100 provides a bias against the backing ring 36 in the direction of the inlet 20 where the second end 98 thereof contacts the backing ring 36 of the poppet 28, to bias the seal 32 carried in the poppet body 30 of the poppet 28 into contact with the seal assembly 26. In this position of the poppet 28, fluid at the inlet 20 is prevented from passing through the valve 10 to the outlet 22.

Figure 4:
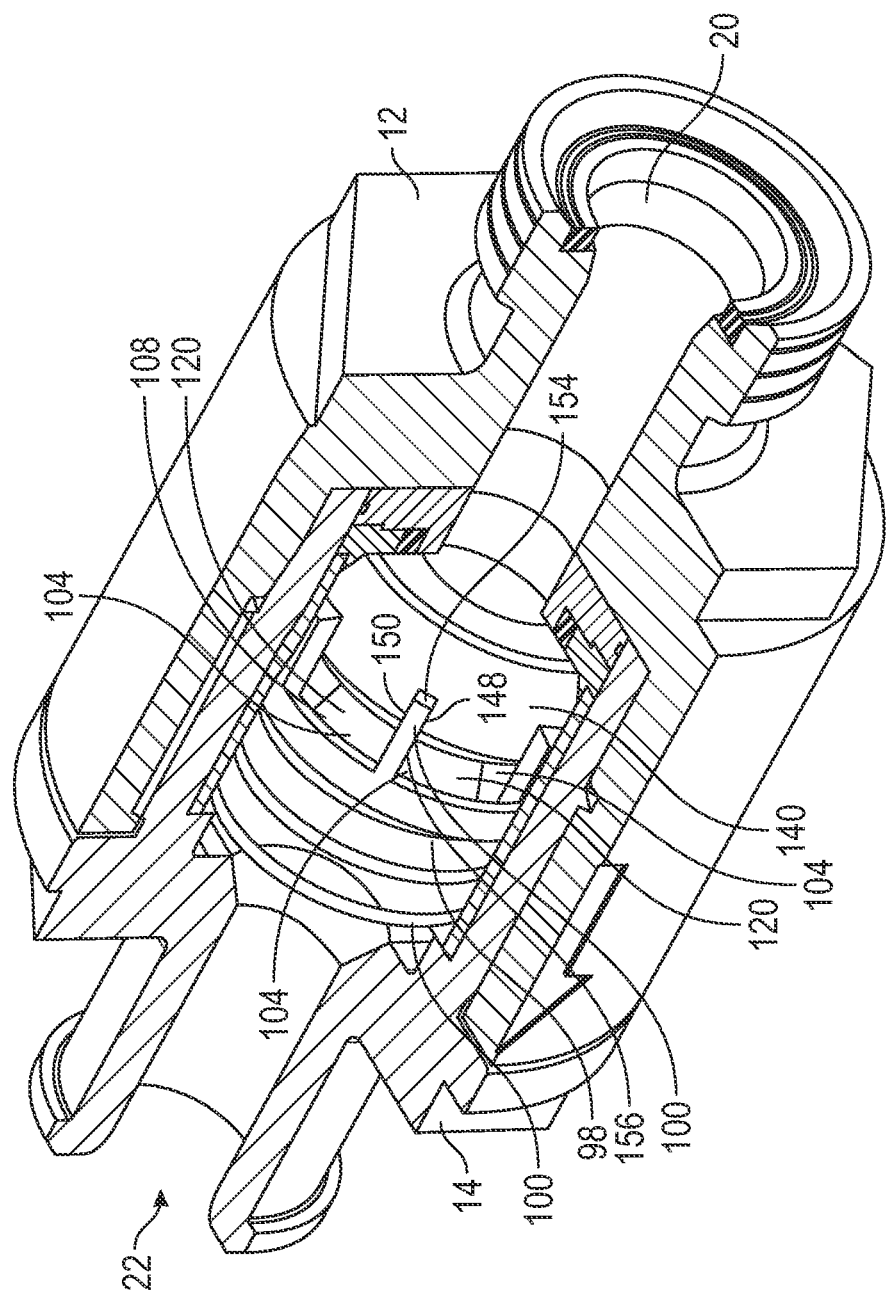
FIG. 4 is a perspective partial sectional view of the valve of FIGS. 1 and 2 in the closed position.
Figure 5:
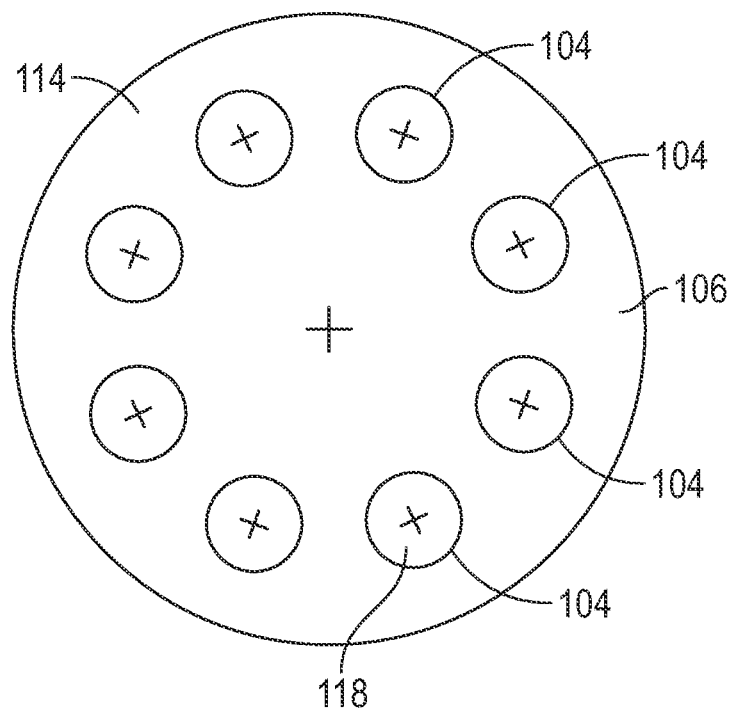
FIG. 5 is a first end view of the poppet of the valve of FIG. 3.

Here, poppet 28 is configured as a unitary member comprising the poppet body 30 having the seal 32 secured thereto, the backing ring 36, and a plurality of struts 110 extending between the poppet body 30 and the backing ring 36, the struts 110 spaced circumferentially about the poppet 28 with flow gaps therebetween. As shown in FIGS. 3, 4 and 5, backing ring 36 is a generally disk shaped member having a plurality of generally circular through passages 104 extending from the outlet facing side 106 to the inlet facing side 108 thereof. The radially outer region of the outlet facing side 106 of the backing ring 36 provides the spring engagement surface 114 against which the second end 98 of the biasing member 38 engages. Each of the through passages 104 is bounded by a first circumferential portion 119 extending inwardly of the backing ring 36 from the outlet facing side 106 thereof, and an annular tapered flow wall 112. Each of the through passages 104 is equally spaced from the two through passages 104 circumferentially adjacent thereto along a bolt circle 118, and struts 110 extend between the poppet body 30 and the inlet facing side 108 of the backing ring 36 at a location circumferentially equidistant to one another, along the bolt circle 118, and thus between each through passage 104. The struts 110 connect the backing ring 36 portion of the poppet 28 to the poppet body 30 of the poppet 28, and provide the sidewalls of a plurality of poppet bypass flow passages 120.

Poppet body 30 here includes an annular inlet facing poppet face 122, from which and into the body extends a first counterbore 124 defining a seal recess composed of an annular seal support wall 126 at the inward terminus of the first counterbore 124 and a circumferential seal support wall 128 forming the circumferential side wall of the first counterbore 124. A circumferential undercut relief recess 130 extends inwardly of the outer circumferential region of the annular seal support wall 126 and terminates radially outwardly at the base of the circumferential seal support wall 128. A second counterbore 132, having a smaller circumference than the first counterbore 124 and generally centered therein and centered with respect to the first bore 44 of the inlet body 12 extends inwardly of the poppet body 30 from the first counterbore 124. The second counterbore is bounded by a counterbore base wall 136, from which extends in the direction of the inlet 20 a circumferential curved wall 138, from which extends a circumferential second counterbore wall 134, extending therefrom to the inner radial end of the annular seal support wall 126. The outer surfaces of the poppet body 30 include a poppet body major wall 140 extending in a direction away from the annular inlet facing poppet face 122, a chamfered cylindrical wall 142 extending from the end of the poppet body major wall 140 distal to the annular inlet facing poppet face 122, an annular outlet facing wall 144 extending radially inwardly from the end of the chamfered cylindrical wall 142 distal to the poppet body major wall 140, and a circumferential hub wall extending therefrom and terminating at a generally circular end wall 146.

Figure 6:
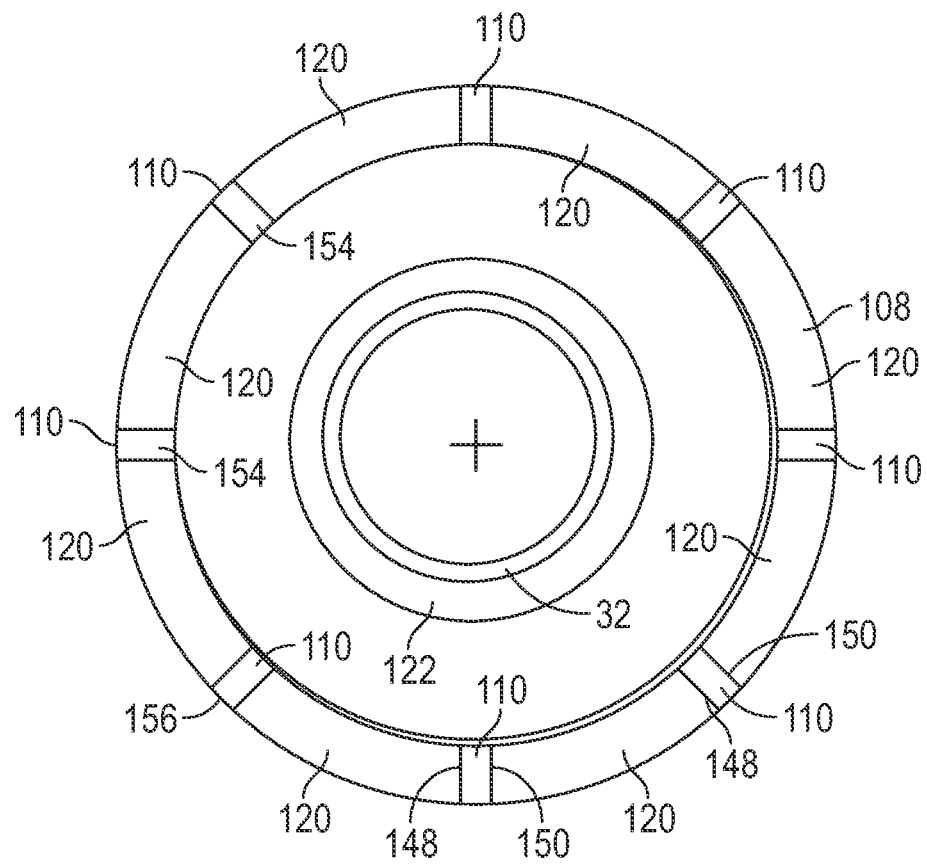
FIG. 6 is a second end view of the poppet of the valve of FIG. 3.

The struts 110 are an integral part of the poppet 28 and interconnect the poppet body 30 to the backing ring 36, such that the poppet body 30 is spaced from the inner circumferential surface 78 of the major bore 70 to form a portion of the plurality of poppet bypass passages 120. Here, each strut 110 has a generally planar aspect having opposed, parallel first and second side walls 148, 150 (FIGS. 4 and 6), wherein each second side wall 150 of a strut 110 faces along the circumference of the poppet body major wall 140 the first side wall of the nearest another strut 110. The radially inner ends of each of the first and second side walls terminate at the intersection thereof with the poppet body major wall 140 and the chamfered cylindrical wall 142. The outlet facing end 152 of each of the struts 110 generally extends from adjacent the intersection of the chamfered cylindrical wall 142 with the annular outlet facing wall 144. A portion of each strut 110 extends along a portion of the poppet body major wall 140, and radially outwardly therefrom, which portion terminates at an inlet facing end wall 154. A short shoulder wall 158 extends between the outer strut wall 156 and the inlet facing side 108 of the backing ring 36. The inner circumferential surface 78, and each of the arcs of the outer strut walls 156, extend in a circumferential direction centered about the valve centerline 46. The outer circumferential surface 190 of the support ring 36 extends along a diameter generally centered on the valve centerline 46. The struts 110 center the poppet body 30, and thus the seal 32 carried therein, with respect to the opening of the first bore 44 through the annular base wall 50.

In the aspect of the valve 10 shown in FIG. 3, an optional inner sleeve 40 is disposed between the outer strut wall 156 and the inner circumferential surface 78 of the outlet body 16. This inner sleeve 40 includes an inner circumferential sleeve wall 164, an outer circumferential sleeve wall 166 facing the inner circumferential surface 78 of the outlet body 16, a first sleeve end wall 168 facing and contacting the annular retainer ledge 76, and a second sleeve end wall 170 facing, and contacting, the seal assembly 26. The outer circumferential sleeve wall 166 is centered about valve centerline 46 and the diameter thereof is sized 3 to 5 thousandths of an inch smaller than the diameter of the inner circumferential surface 78. The inner circumferential sleeve wall 164 is likewise centered about the valve centerline 46 and is sized 3 to 5 thousandths of an inch smaller than the diameter of the outer circumferential surface 190 of the support ring and of a circle connecting the curved outer surfaces of the struts 110. Thus, sleeve 162, where used, can be inserted into the major bore 70 of the outlet body 16, and poppet body 30 can move within and respect to the sleeve 162 while the struts 110 support the poppet body radially spaced from the sleeve 162. Alternatively, the inner sleeve 40 may not be used, and the diameter of the outer circumferential surface 190 of the support ring and of a circle connecting the curved outer surfaces of the struts 110 are sized 3 to 5 thousandths of an inch smaller than the diameter of the inner circumferential surface 78.

Seal 32 here is configured of a single crystal material, preferably a corundum material, such as a grown single crystal corundum known as sapphire or ruby. Seal 32 here includes an outer cylindrical seal surface 172 facing the circumferential seal support wall 128, an inner circumferential seal surface 174, a first seal annular side wall 176 facing the annular seal support wall 126, and a second seal annular side wall 178 facing the seal assembly 26. Here, the seal 32 is press fit into the seal recess defined by the annular seal support wall 126 circumferential seal support wall 128. Thus in a free state, before being press fit into the seal recess defined by the annular seal support wall 126 circumferential seal support wall 128, the outer circumferential seal surface 172 has a greater diameter than the diameter of the circumferential seal support wall 128, and the pressing of the seal 32 into the seal recess results in an interference fit securing the seal 32 in the seal recess. Alternatively, the poppet body 30 can be heated to increase the diameter of the circumferential seal support wall 128 to be greater than the outer diameter of the outer circumferential seal surface 172 and the seal 32 placed into the seal recess and the poppet body 30 cooled to shrink and thereby secure the seal assembly 26 therein. The seal 32 may be configured as a rectangle, in section, where each face of the rectangle join at a right angle, or otherwise. For example, as shown in FIG. 3, the seal 32 may be a ring having a frustoconical second annular side wall 178 for engagement against the conformable seal ring 184. Here, the outer circumferential seal surface 172 extends further from the first annular side wall 176 of the seal than does the inner circumferential seal surface 174.

Seal assembly 26 here includes a guide hub 180 including a guide hub boss 182, over which is piloted a conformable seal ring 184, and two halves of a split ring 186 disposed between the seal ring outer circumferential surface 188 and the inner circumferential sleeve wall 164 of the inner sleeve 40. Split ring 186 is configured to radially inwardly bias the conformable seal ring 184. Where the inner sleeve 40 is not used, the split ring assembly is disposed between the seal ring outer circumferential surface 188 and the inner circumferential surface 78 of the major bore 70.

Guide hub 180 is a generally annular disk shaped member, having an inner circumferential hub bore bounded by an inner spool bore surface 192, which extends from an inlet side annular wall 194 to an outlet side annular wall 196 of the guide hub 180. A hub flange 198 extends radially outwardly from the base of the guide hub boss 182 and radially outwardly therefrom to guide hub outer circumferential surface 200. Here, the diameter of the hub bore 190 is substantially the same or larger than the diameter of the first bore 44 of the inlet 20, such that the inlet side annular wall 194 does not extend radially inwardly of the first bore 44 of the inlet 20. Guide hub outer circumferential surface 200 includes a circumferential seal ring groove 202 extending inwardly thereof, within which a seal, such as an O-ring, or an O-ring with a backing ring or backing rings, is disposed. On the outlet facing side of the hub flange 198 is provided a stepped surface 206, including an inner first portion 208 extending radially outwardly from the base of the guide hub boss 182, a recessed outer second portion 210 extending radially inwardly from the guide hub outer circumferential surface 200, and a circumferential undercut surface 212 extending between the radially outwardly of the guide boss end 214 of the first portion 208 and the radially inwardly of the outer circumferential surface end 216 of the second portion 210.

Figure 8:
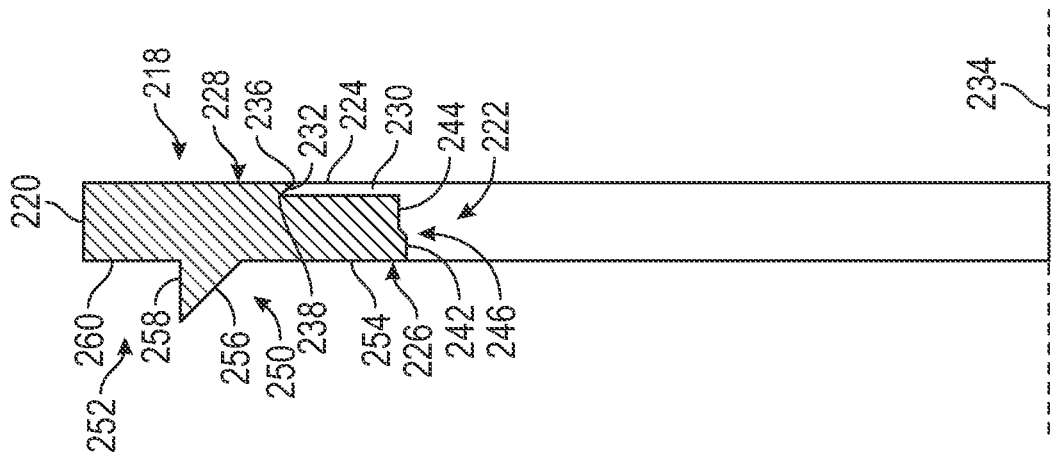
FIG. 8 is a partial sectional view of the seal assembly of FIG. 7.
Figure 7:
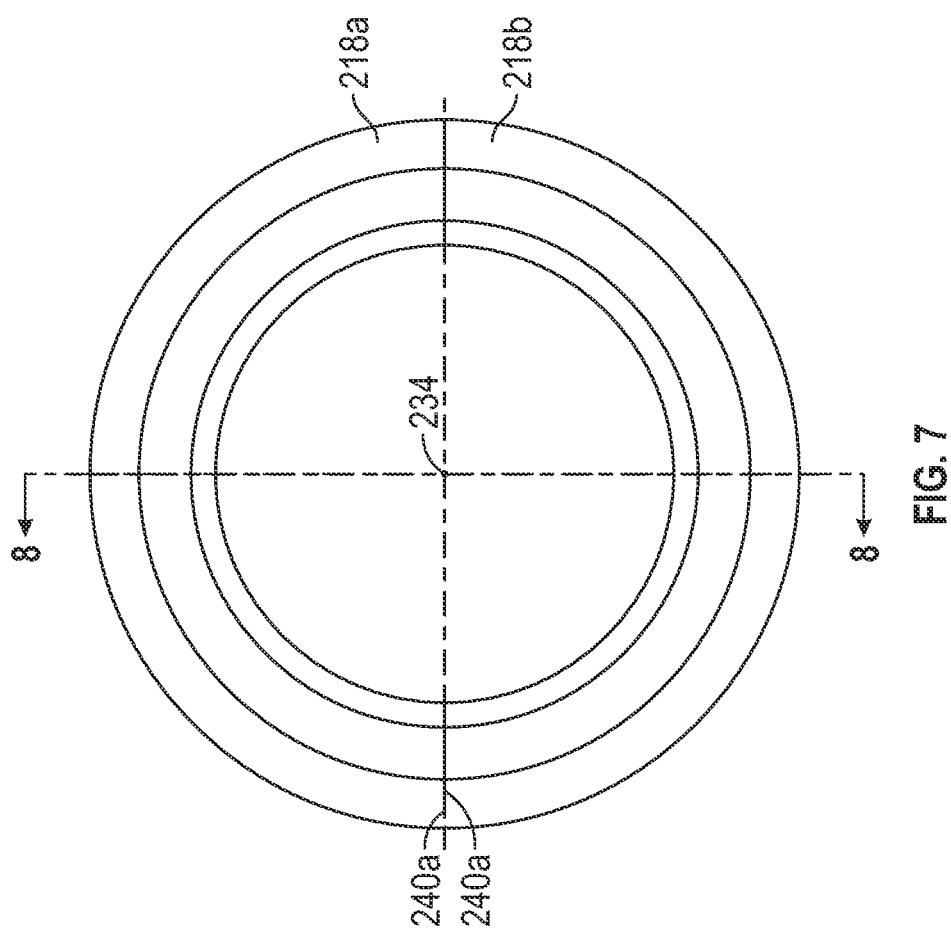
FIG. 7 is a side view of the seal assembly of the valve of FIG. 3.

As shown in FIG. 7, split ring 186 here is configured of two half rings 218a, b, wherein each half ring has the same cross sectional profile and the half rings 218a, b are provided by machining the profile thereof into a continuous annular ring and cutting the continuous ring into two halves, or into two equal or nearly equal in circumferential length half rings 218a, b. Each half ring 218a, b is substantially identical. As shown in FIG. 8, the outer contour or profile of the split rings 186, here half ring 218a includes an outer semi-circumferential surface 220, an inner contoured circumferential wall 222, an undercut first annular side face 224 extending between the outer semi-circumferential surface 220 and the inner contoured circumferential wall 222, and an opposed second annular side face 226 extending between the outer semi-circumferential surface 220 and the inner contoured circumferential wall 222. First annular side face 224 includes a radially outwardly located raised surface 228 extending radially inwardly from the outer semi-circumferential surface 220, a radially inwardly located recessed surface 230 extending radially outwardly of the inner contoured circumferential wall 222, and an angled surface 232 extending between the radially outer terminus of the recessed surface 230 and the radially inner terminus 236 of the raised surface 228. The outer terminus of the of the recessed surface 230 extends further from the split ring centerline 234 than does the inner terminus 236 of the raised surface 228, and thus a portion of the raised surface 228 extends over a portion of the recessed surface 230. Thus, the angled surface 238 provides a partial frustoconical ledge that comes into contact with the circumferential undercut surface 212 which provides a mating frustoconical surface to contact the angled surface 238. As the half rings 218a, b are pressed to bring their facing end walls 240a, b at opposed ends of each of the spilt rings together, the angled surface 238 slides along the undercut surface 212 to cause the raised surface 228 of the half rings 218a, b to move toward the circumferential undercut surface 212 of the guide hub, and the recessed surface 230 of each half ring 218a, b to move toward the first portion 208 of the stepped surface 206 and the raised surface 218 of each half ring 218a, b to move toward the outer second portion 210 of the stepped surface 206 of the guide hub 180. The contact of one of the raised surface 218 of each half ring 218a, b with the outer second portion 210 of the stepped surface of the guide hub 180 or the recessed surface 230 of each half ring 218a, b with the inner first inner portion of the guide hub, or both, limits the radially inward travel of the an inner contoured circumferential wall 222 toward the valve centerline 46. Here, the guide hub boss 182 has about its outer circumference a seal support wall, on which the conformable seal ring 184 is piloted. Movement of the conformable seal ring 184 over the guide hub boss 182 is limited by the contact of the seal against the first portion 208 of the stepped the inner contoured circumferential wall 222 surface 206 of the guide hub 180. Thus, radially inward moving of the half rings 218a, b contacts the inner contoured circumferential walls 222 of the half rings 218a, b with the seal ring outer circumferential surface 232. Here, the inner contoured circumferential wall 222 of each half ring 218a, b includes a first half ring inner wall surface 242 generally parallel to the split ring centerline 234, a second half ring inner wall surface 244 extending generally parallel to the split ring centerline 234, and a taper wall 246 extending at an oblique angle to the split ring centerline 234 and connecting the adjacent ends of the first and second split ring inner wall surfaces 242, 244. Here, the first split ring inner wall surface 242 extends in an arc centered at the split ring centerline 234 which is shorter than the length of an arc centered at the split ring centerline 234 along which the second inner split ring surface 238 extends. Thus, the first half ring inner wall surface 242 will contact the seal before the second half ring inner wall surface 244 can contact the seal ring 184, to allow a portion of the seal ring 184 to form a retaining bulge 248 therein when the half rings 218a, b are connected over the guide hub 180 as shown in FIG. 3. This retaining bulge 248 is bounded in part by the taper wall 246 of the half rings 218a, b, which prevents the conformable seal ring 184 from lifting off of the inner first portion 208 of the stepped portion of the guide hub 180.

The second annular side face 226 of the half rings 218a, b here include an integral flow guide surface 250 and sleeve recess 252 formed thereon. Thus, second annular side face 226 is configured with a first flow surface 254 extending generally perpendicular to the split ring 196 centerline 235 and radially outwardly from the intersection of the second annular side face 226 with the first half ring inner wall surface 242. First flow surface 254 extends from the intersection thereof with the first half ring inner wall surface 242 to a frustoconical second flow surface 256, which extends radially outwardly therefrom to an inwardly projecting guide ledge 258 extending from the radially outward end of the second flow surface 256 inwardly of the half rings 218a, b.

Guide ledge 258 is a surface extending generally parallel to the split ring centerline 234, and terminates at a sleeve limit wall 260 extending radially outwardly thereof, generally perpendicular to the split ring centerline 234, which ends at the outer semi-circumferential surface 220 of the half rings 218a, b. Guide ledge 258 is configured to extend over the outer surface of the inner circumferential sleeve wall 176 of inner sleeve for a portion thereof inwardly thereof from the second sleeve end wall 170.

Figure 9:
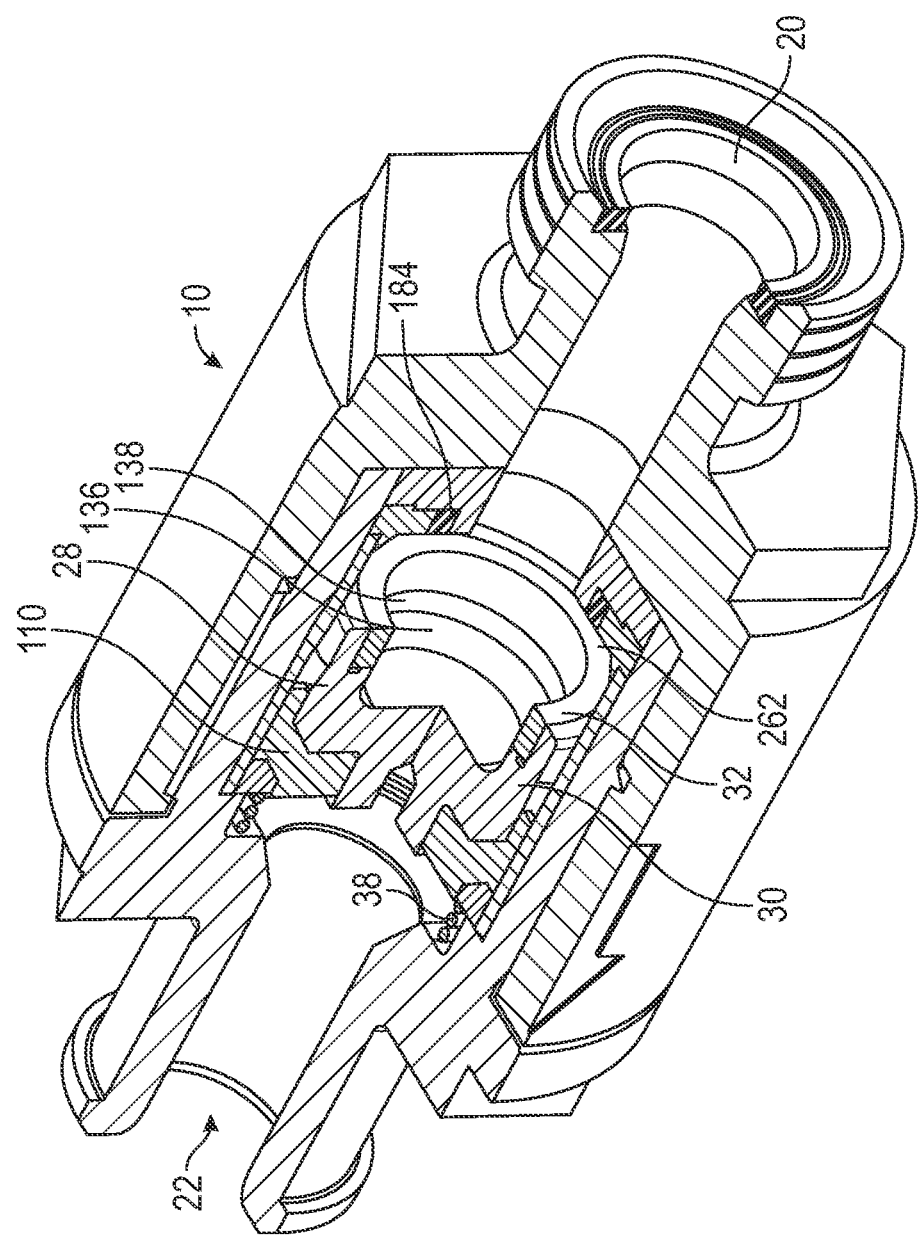
FIG. 9 is a perspective partial sectional view of the valve of FIGS. 1 and 2 in the open position.
Figure 10:
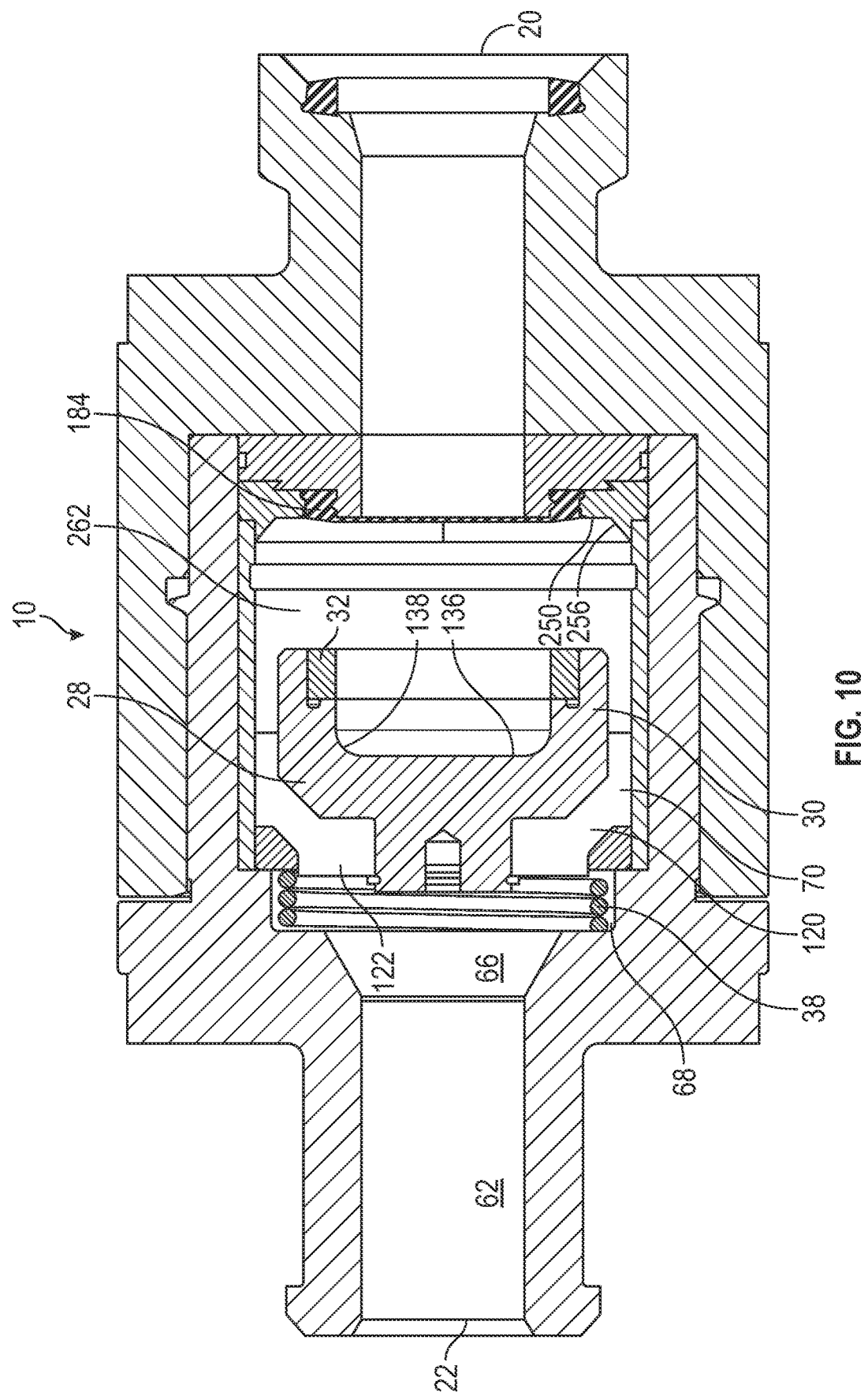
FIG. 10 is a sectional view of the valve of FIGS. 1 and 2 in the open position.

Referring to FIGS. 3, 9 and 10, the valve 10 is shown in a closed position in FIG. 3 where the poppet body 30 has biased the seal 32 thereof against the seal ring 184 and thus prevent fluid flow from the inlet 20 to the outlet 22 of the valve 10, and in the fully open position in FIGS. 9 and 10 where the poppet 28 is fully retracted away from the seal assembly 26 to the greatest extent possible. In the valve 10 closed position, the biasing member 38 provides a biasing force to bias the poppet body 30 toward the inlet 20, and thus the seal 32 against the seal ring 184. Here, if the pressure in the first bore 44 (the inlet 20) is of a sufficiently high magnitude, this pressure bearing against the counterbore base wall 136 and circumferential curved wall 138 can be sufficient to create a biasing force against the force of the biasing member 38 greater than the counter-biasing force of the biasing member 38, causing the poppet body 30 and thus the poppet 28 to move in the direction of the outlet 22, pulling the seal 32 away from the seal ring 184 and allowing fluid flow from the inlet 20 to the outlet 22.

Figure 11:
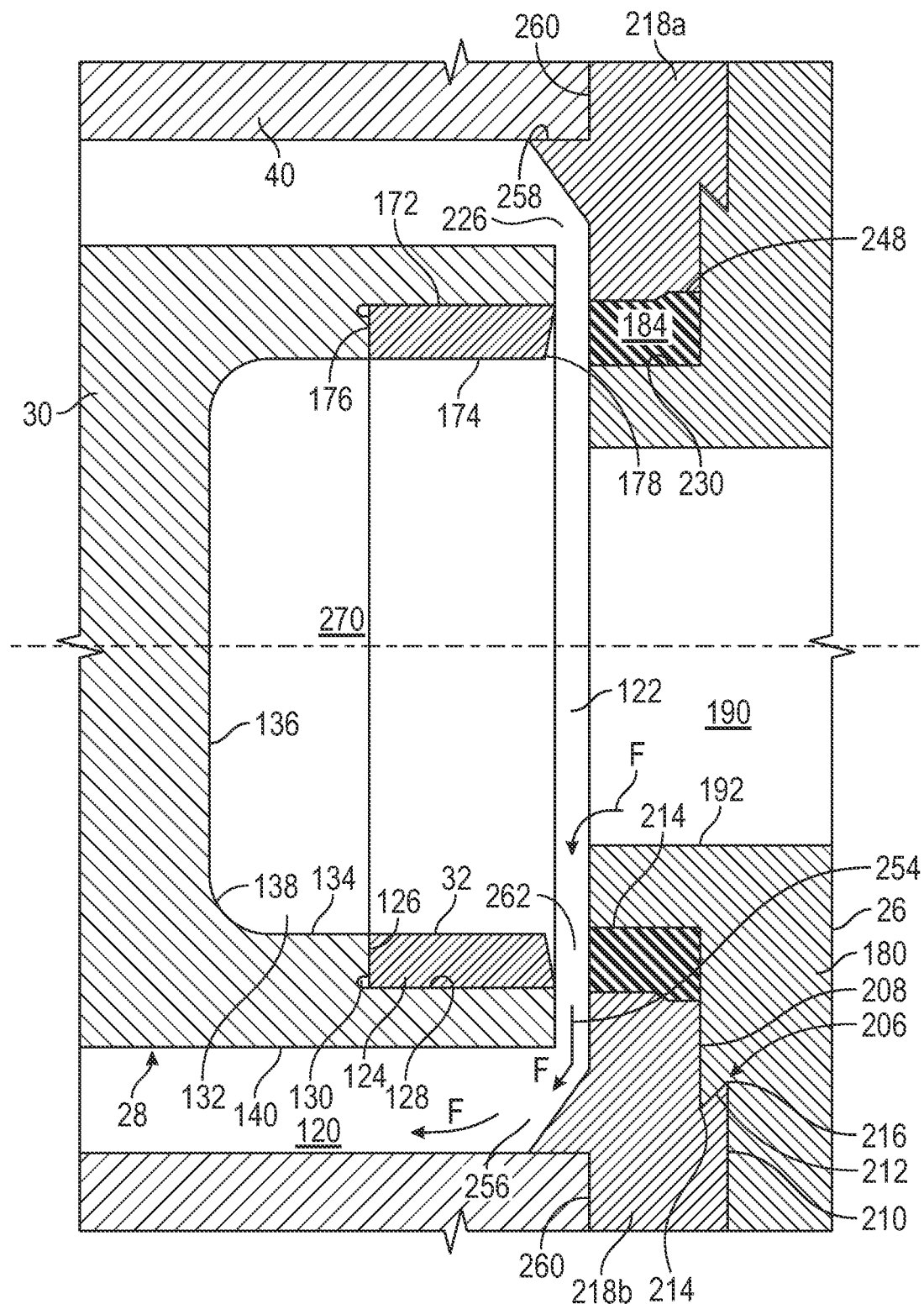
FIG. 11 is a partial sectional view of the valve of FIGS. 1 and 2 showing the gap formed between the poppet and seal assembly thereof as the valve begins to open.

As the poppet 28 begins moving away from the seal assembly 26, such that the poppet 28 is positioned within the inner volume 24 to locate the seal 32 in the poppet body 30 spaced from the seal ring 184, a circumferential gap 262 is created between the annular side wall 178 of the seal 32 and the facing annular seating surface 264 of the conformable seal ring 184. Initially, the higher pressure fluid at the inlet 20, of which the pressure is higher as compared to the pressure of the fluid present in the outlet bore 62, is now able to flow inwardly of the inlet 20, then in a radially outward direction through the circumferential gap 262, where it continues to flow through the poppet bypass passages 120 and the through passages 104 and into the major bore 70, spring bore 68 and tapered bore 66 and thence through the outlet bore 62 to the outlet 22. As the fluid flow from the inlet 20 to the outlet initiates, the size of the gap 262 between the seal 32 and the seal ring 184 and between the inlet facing poppet face 122 and the integral flow guide surface 250 is small, and thus the circumferential gap 262 is small in the direction of the valve centerline 46 as shown in FIG. 11. Here, where the gap 262 is small, the second flow surface 256 of the half rings 218a, b functions to redirect the flow from a radial direction perpendicular to the valve centerline 46 to a flow partially in the direction of the longitudinal axis as shown by the arrows F in FIG. 11, representing the flow path as the gap 262 is just formed. The fluid flowing through the gap 262 is flowing generally parallel to the gap-facing surface of the seal 32 and seal ring 184, and the gap facing surfaces of the between the inlet facing poppet face 122 and the integral flow guide surface 250. As the fluid passes further radially outwardly, it obliquely impinges upon the second flow surface 256, which redirects it to be directed at a non-perpendicular angle against the inner surface of the inner sleeve 40 or the inner circumferential surface 78 of the outlet body 16. As the impact angle of the flow against the inner surface of the inner sleeve 40 or the inner circumferential surface 78 of the outlet body 16 where inner sleeve 40 is not present is lower than 90 degrees, the impact energy of the fluid and the abrasives therein against those surfaces is reduced, resulting in reduced erosion of these surfaces.

The width of the gap 262 between the poppet body 30 and the seal assembly 26 is a function of the pressure difference between the inlet 20 and the outlet 22, where the greater the pressure in the inlet is higher than the pressure at the outlet, the farther in the direction of the outlet 22 the poppet 28 will move, limited to its maximum stroke or movement distance where the biasing member 38 can be no further compressed. The flow of the fluid from the inlet 20 to the outlet 22 when the valve is in the open condition shown in FIGS. 9 to 11 will result in reduced fluid pressure at the inlet 20, and as the pressure is reduced at the inlet 20, the bias force of the fluid pressure at the inlet pushing against the counterbore base wall 136 and circumferential curved wall 138 will become insufficient to compress the spring of the biasing member 38, causing the biasing member 38 to push the poppet 28 in the direction of the inlet 20, thereby pressing the annular side wall 178 of the seal 32 against the facing annular seating surface 264 of the conformable seal ring 184 to seal off the inlet 20 from the outlet 22.

Figure 12:
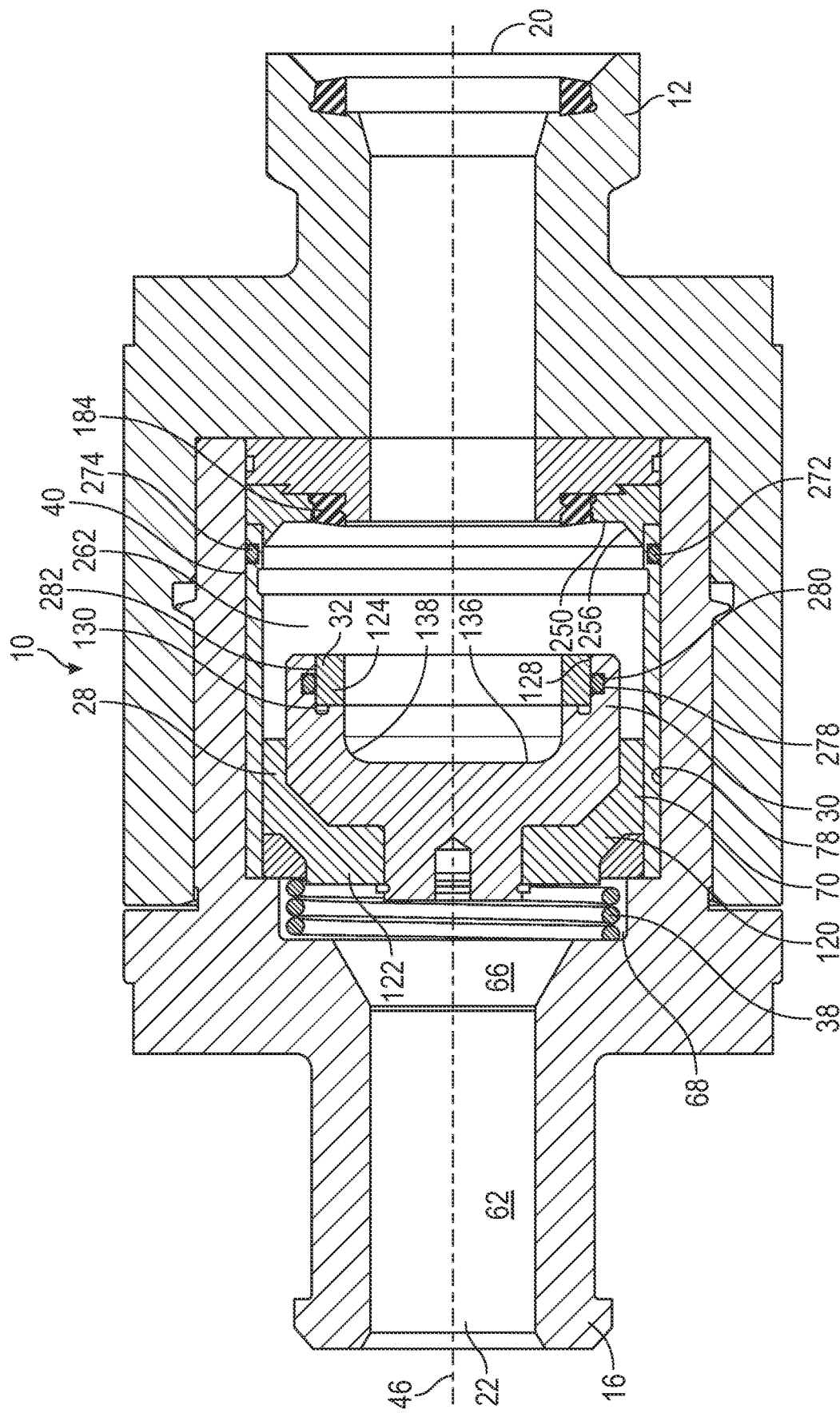
FIG. 12 is a sectional view of an additional construct of the valve of FIGS. 1 to 3.

FIG. 12 is a sectional view of the valve 10, showing additional or alternative aspects thereof. Here, the circumferential seal support wall 128 forming the circumferential side wall of the first counterbore 124 includes a seal circumferential sidewall seal groove 278 extending thereinto, circumferentially. A seal circumferential sidewall seal ring 280 is received in the seal circumferential sidewall seal groove 278, to form a seal between the outer circumferential surface 282 of the seal 32 element and the circumferential seal support wall 128. The seal circumferential sidewall seal ring 280 is received in the seal circumferential sidewall seal groove 278 can be sized to slightly space the outer circumferential surface 282 of the seal 32 from the circumferential seal support wall 128 to allow the seal 32 to float therein, allowing for the seal 32 to tilt or cock with respect to the circumferential seal support wall 128 as it is engaged against the conformable seal ring 184. Additionally, the seal circumferential sidewall seal ring 280 can be configured to be squeezed between the seal out circumferential surface 282 and the base of, or base and sidewall of, the seal circumferential sidewall seal groove 278, sufficiently to maintain the seal 32 in the seal recess composed of an annular seal support wall 126 at the inward terminus of the first counterbore 124 and a circumferential seal support wall 128 forming the circumferential side wall of the counterbore 124.

Additionally, the outer circumferential surface of the inner sleeve 40 includes a circumferential sleeve seal groove 272 extending therein, circumferentially around the outer circumferential surface of the inner sleeve 40, and a seal ring 274, such as an O-ring, is received thereinto, to form a seal between the outer circumferential surface of the inner sleeve 40 and the inner circumferential surface 78 of the major bore 70 of the outlet body 16.

Figure 13:
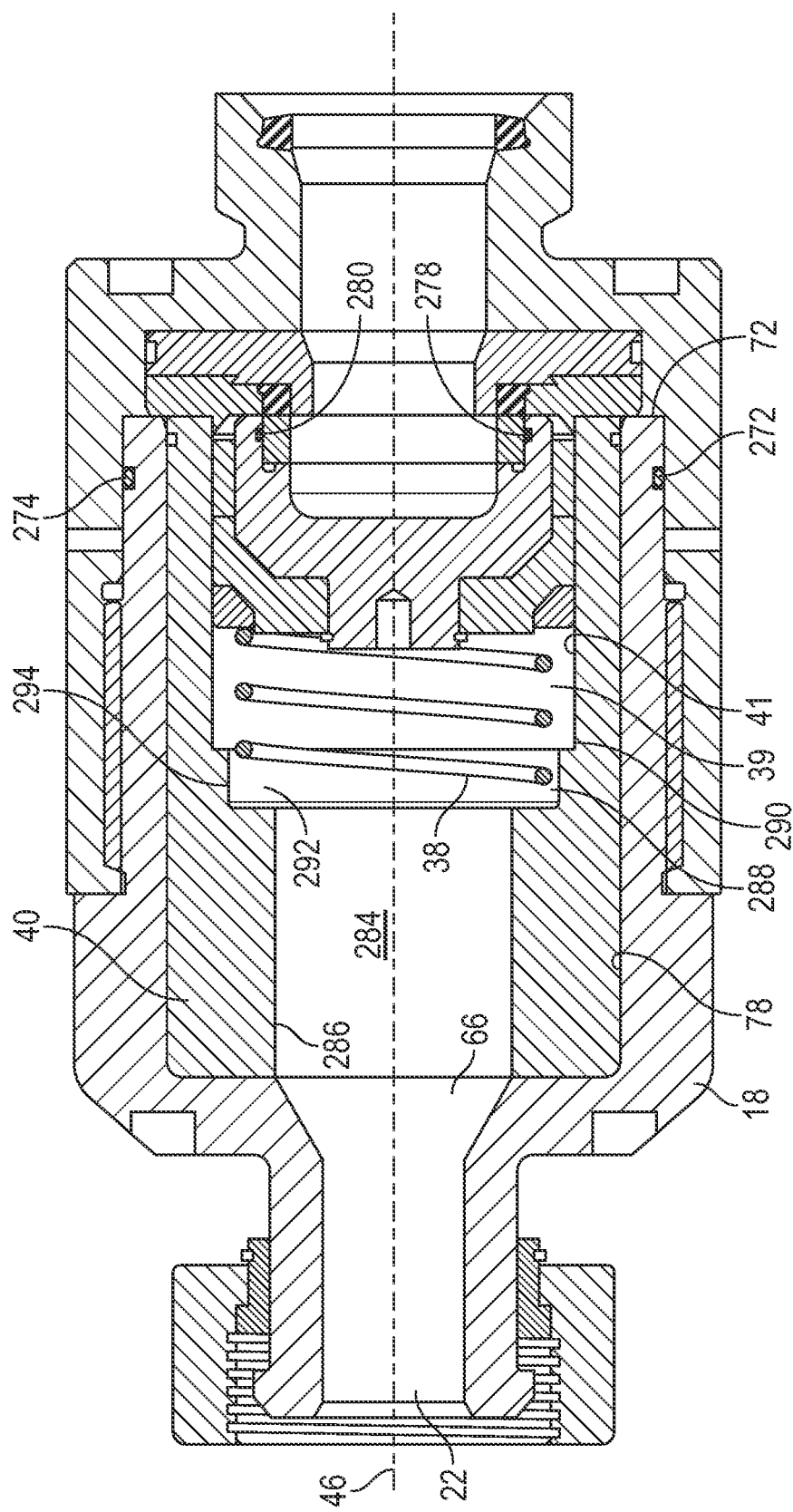
FIG. 13 is a sectional view of another additional construct of the valve of FIGS. 1 to 3.

FIG. 13 is a further sectional view of the valve 10, showing additional or alternative aspects thereof. Here, the outlet body 16 is modified, as compared to that of FIG. 3, so that the major bore 70 extends from the inner terminus, within the outlet body 18, of the tapered bore 66 and inwardly of the outlet body 16 therefrom, a spring bore 68 extending inwardly of outlet body 16 from the tapered bore 66, terminating at the second body annular end wall 72. Here, the inner circumferential surface 41 of the poppet bore 39 does not extend all the way through the inner sleeve 40 in the direction of the centerline 46, as the spring bore 68 of the outlet body 18 is here located within the inner sleeve 40.

Thus, the inner volume of the inner sleeve 40 is here defined by a sleeve outlet bore 284 extending inwardly from the direction of the tapered bore defined by an sleeve outlet bore circumferential surface 286 extending thereabout, the poppet bore 39 extending inwardly of the sleeve from end of the inner sleeve 40 facing the valve 10 inlet 20, and a sleeve spring bore 288 interposed between the sleeve outlet bore 284 and the poppet bore 39. Sleeve spring bore has an intermediate diameter of circumference between the smaller in diameter or circumference sleeve outlet bore 284 and the larger in diameter or circumference poppet bore 39. Sleeve spring bore is defined by a sleeve spring circumferential wall 294 extending from the inner circumference of a first annular sleeve ledge 290 extending radially inwardly from the inner terminus of the poppet bore 39 to the outer circumference of a second annular sleeve ledge 292 extending radially outwardly from the inner terminus of the sleeve outlet bore 284. Second annular sleeve ledge 292 provides a support ledge against which the end of the biasing member 38 opposite from the poppet body 30 is grounded.

Also, here the circumferential seal support wall 128 forming the circumferential side wall of the counterbore 124 includes the seal circumferential sidewall seal groove 278 extending thereinto, and the surface 282 of the seal 32 element and the circumferential seal support wall 128. seal circumferential sidewall seal ring 280 such as an O-ring, received in the seal circumferential sidewall seal groove 278, to form a seal between the outer circumferential The seal circumferential sidewall seal ring 280 is received in the seal circumferential sidewall seal groove 278 can be sized to slightly space the outer circumferential surface 282 of the seal 32 from the circumferential seal support wall 128 to allow the seal 32 to float therein, allowing for the seal 32 to tilt or cock with respect to the circumferential seal support wall 128 as it is engaged against the conformable seal ring 184. Additionally, the seal circumferential sidewall seal ring 280 can be configured to be squeezed between the seal out circumferential surface 282 and the base of, or base and sidewall of, the seal circumferential sidewall seal groove 278, sufficiently to maintain the seal 32 in the seal recess composed of an annular seal support wall 126 at the inward terminus of the first counterbore 124 and a circumferential seal support wall 128 forming the circumferential side wall of the counterbore 124.

Additionally, the outer circumferential surface of the inner sleeve 40 includes the circumferential sleeve seal groove 272 extending therein, circumferentially around the outer circumferential surface of the inner sleeve 40, and the seal ring 274, such as an O-ring, is received thereinto, to form a seal between the outer circumferential surface of the inner sleeve 40 and the inner circumferential surface 78 of the major bore 70 of the outlet body 16.

Figure 14:
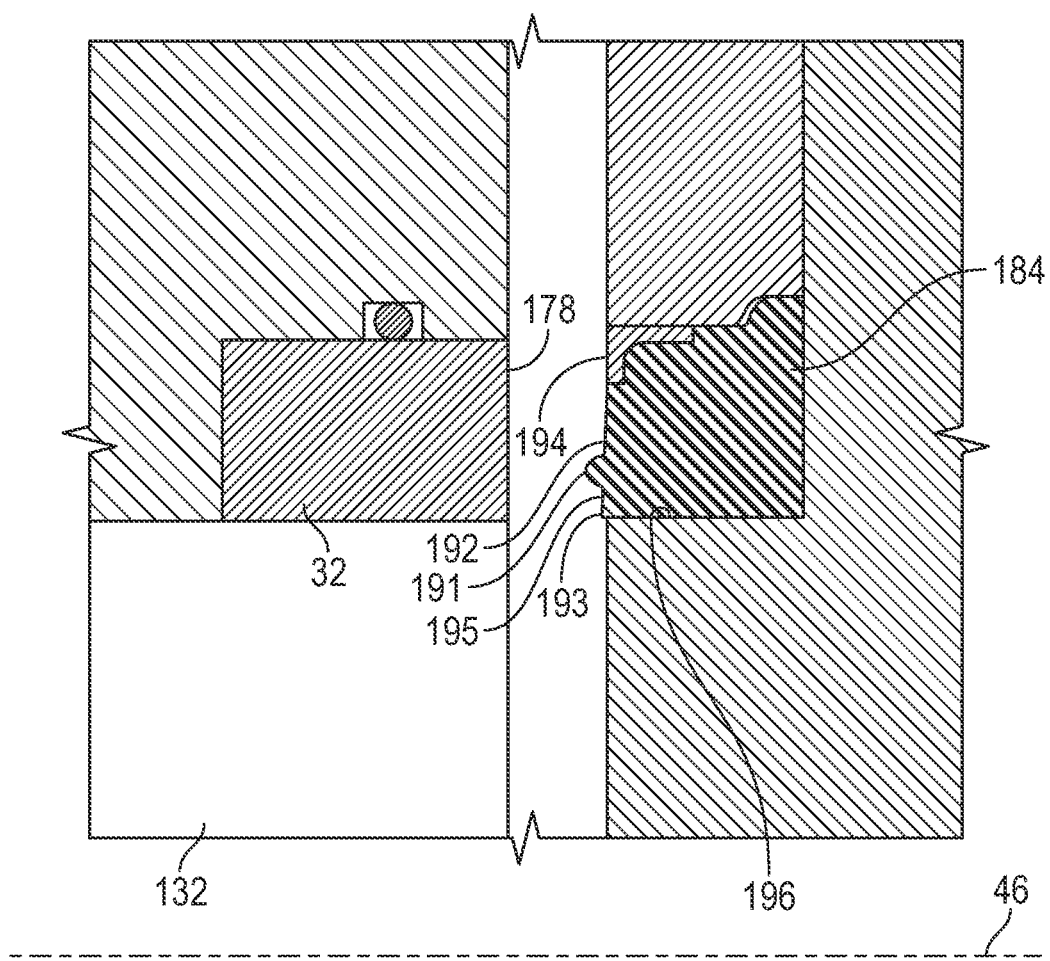
FIG. 14 is a detailed view of a conformable seal ring selectively sealing against a seal ring in the poppet.

FIG. 14 depicts an additional aspect of the conformable seal ring 184, wherein the conformable annular seal surface 192 thereof includes one or more circumferential protrusions or ridges 191 extending outwardly in the direction of seal 32, to seal against the facing surface of seal 32. Here, the second annular side wall 178 facing surface of the seal 32 does not have the frustoconical aspect thereof in FIG. 3, but it may be configured to be frustoconical here as well. Additionally, the conformable annular seal surface 192 of the conformable seal ring 184 is shown as being frustoconical, although it can be configured such the base 195 thereof, from which the ridges 191 extend, can be at a right angle to the outer circumferential face thereof.

The poppet body 30 here is configured to create a stagnation region 270 in the second counterbore 132 where the fluid flowing from the inlet 20 through the through the circumferential gap 262 fills the second counterbore 132 but either comes to rest, or is moving relatively slowly, along the surfaces of the second counterbore 132. This reduces the erosion on the surfaces of the poppet 28 facing the inlet 20 as compared to a poppet having a flat surface facing the inlet 20. Additionally, the fluid velocity will be greatest along and generally parallel to the second seal annular side wall 178, where the corundum material presents high resistance to erosion. Thus, the valve 10 provides a number of features resulting in lower wear of the components thereof as compared to traditional poppet valves, including the use of a corundum seal 32 on the poppet 28, and the flow directing features of the seal assembly 26. Additionally, the use of a corundum seal contacting a conformable seal ring 184 configured of, for example, PEEK, Delran, engineered plastics or polymers, or an elastomer, allows the facing surfaces of the seal 32 and seal ring 184 to seal with particulates therebetween, as the seal ring 184 will conform and compress over the particulate materials and still contact the facing surface of the seal. The use of a poppet 28 having struts 110 to center the poppet 28 in the valve inner volume 24 reduces the friction between the poppet and the inner surface of the outlet body 16, or of the inner sleeve 40 where used, and, the relatively area of the facing surfaces of the struts 110 and the inner surface of the outlet body 16 or inner sleeve 40 reduces the likelihood that the poppet 28 will become jammed in the valve due to particulates present between the struts and the facing surface of the outlet body 16 or inner sleeve 40. Additionally, the construct of the poppet 28 facing the inlet 20 to cause flow to stagnate thereat reduces the erosion of the front face of the poppet 28. These and other features of the disclosure are found in the appended claims.

What is claimed is:
1. A valve comprising:
    a first body having an inlet and an annular base wall surrounding the inlet at a location inwardly of the first body;
    a second body having an outlet and a poppet bore having a circumferential poppet bore surface;
    a poppet located in the poppet bore and having a sealing face, the sealing face facing the annular base wall of the first body; and
    a sealing arrangement comprising;
    a circumferential support surface;
    a compressible seal ring having an uncompressed free state and a compressed state, an outer circumferential surface, and an inner circumferential surface facing the circumferential support surface; and
    a split ring disposed over the outer circumferential surface of the compressible seal ring, the compressible seal ring in a compressed state between the split ring and the circumferential support surface.
2. The valve of claim 1, further comprising
    an annular seal support wall extending radially outwardly from the circumferential support surface;
    the split ring comprising a circumferential recess; and
    a portion of the compressible seal ring adjacent to the annular seal support wall extends inwardly of the circumferential recess.
3. The valve of claim 2, wherein the split ring comprises a first ring half and a second ring half.
4. The valve of claim 3, wherein the circumferential recess is provided as a tapered wall of the first half ring and of the second half ring, the tapered walls of the first half ring and of the second half ring facing the annular seat support surface.

5. The valve of claim 2, further comprising an annular recessed wall extending radially outwardly of the annular seal support wall and a circumferential undercut wall extending between the annular seal support wall and the annular recessed wall; and
  the split ring includes a frustoconical wall extending between the circumferential undercut wall and the annular recessed wall.

6. The valve of claim 1, wherein the split ring further comprises an inner annular face having a first inner circumferential wall and a second inner circumferential wall, the second inner circumferential wall having a frustoconical profile.

7. The valve of claim 6, wherein a second annular wall faces toward the inlet of the first body.

8. The valve of claim 1, further comprising a seal support plate, wherein the circumferential support surface is a projection of a portion of the seal support plate; and,
  the seal support plate further comprises a first annular seating surface extending radially outwardly of the circumferential support surface, a second annular surface extending radially outwardly of the first annular surface, and an undercut portion extending between the outer circumference of the first surface and the inner circumference of the second annular surface.

9. The valve of claim 8, wherein the inner circumference of the second annular surface has a smaller diameter than the diameter of the outer circumference of the first annular surface.

10. The valve of claim 1, wherein the circumferential support surface comprises a base and a projection projecting outwardly of the base and inwardly of the compressible seal ring.

11. The valve of claim 1, wherein the sealing face of the poppet is a frustoconical surface facing the compressible seal ring.

12. The valve of claim 1, wherein the split ring further includes a first flow surface extending radially away from the compressible seal ring, and a second flow surface extending from the first flow surface and in the direction of the poppet.

13. The valve of claim 12, wherein the second flow surface is a frustoconical flow surface.

* * * * *